Jan. 1, 1957  J. H. RENAUDIE  2,775,980
AUTOMATIC SWITCHING VALVE
Filed July 18, 1952                                             3 Sheets-Sheet 1
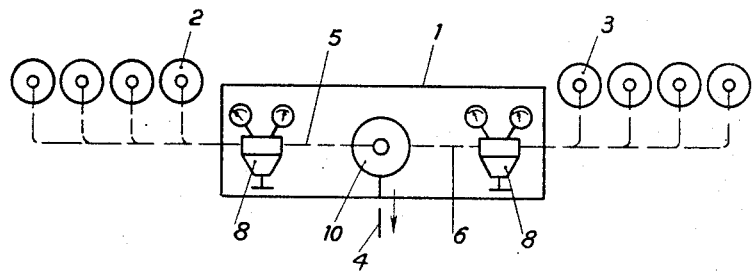
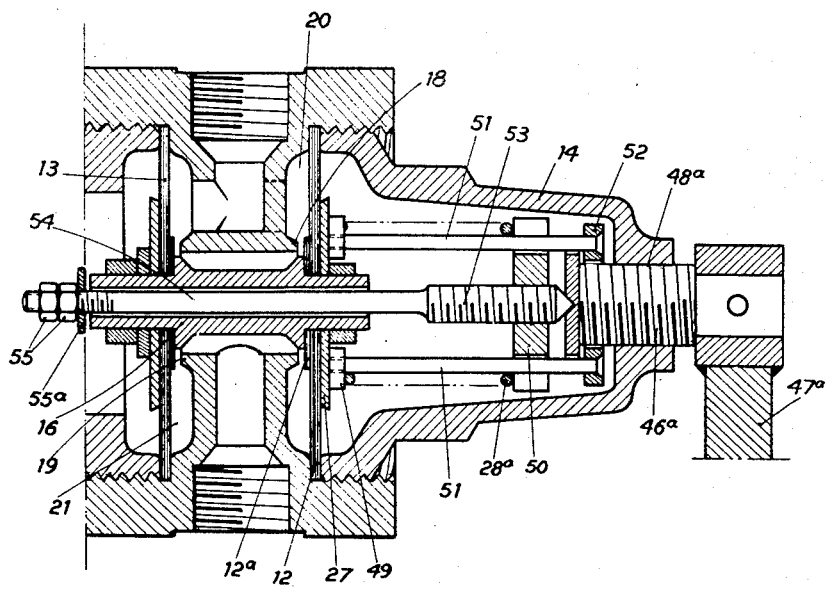
INVENTOR
JACQUES HENRI RENAUDIE,
BY Stone, Boyden & Mack
ATTORNEYS

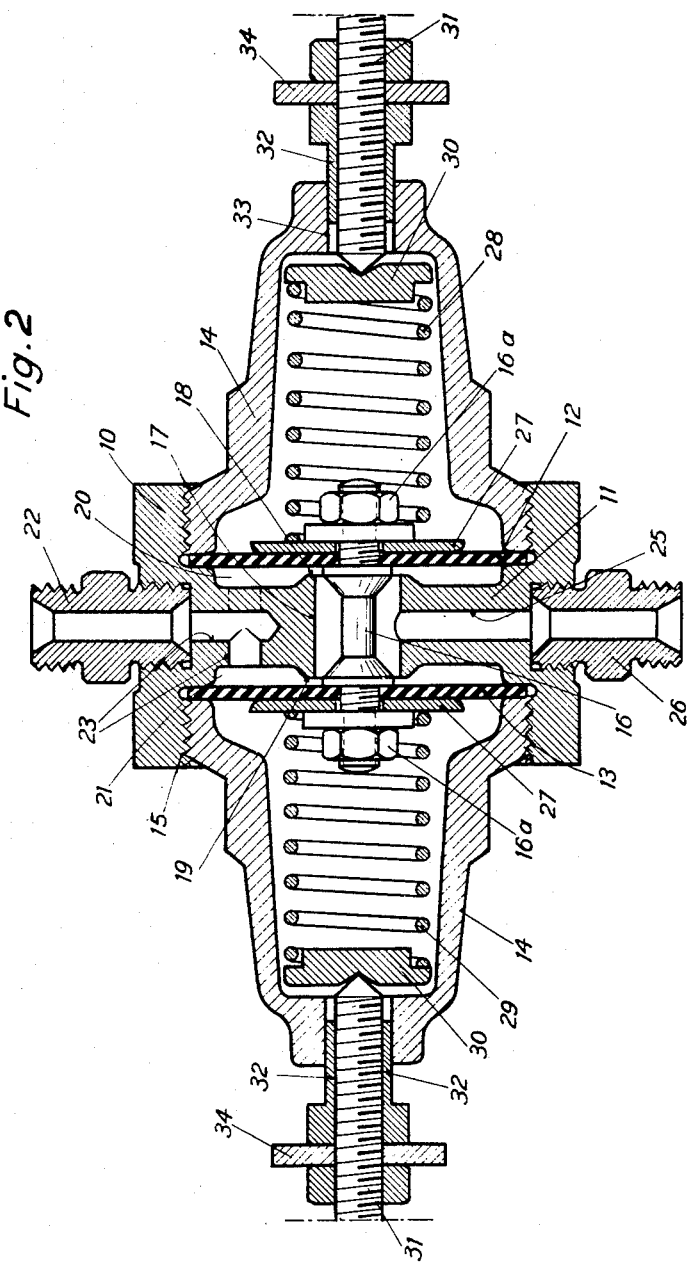

INVENTOR
JACQUES HENRI RENAUDIE,

BY Stone, Boyden & Mack.
ATTORNEYS

United States Patent Office 2,775,980
Patented Jan. 1, 1957

2,775,980

AUTOMATIC SWITCHING VALVE

Jacques Henri Renaudie, Boulogne-sur-Seine, France, assignor to L'Air Liquide, Societe Anonyme pour l'Etude et l'Exploitation des Procedes Georges Claude, Paris, France Application July 18, 1952, Serial No. 299,633

Claims priority, application France July 20, 1951

4 Claims. (Cl. 137—113)

My invention has, as an object, a switching valve, applicable, in a general manner, to all cases in which it is desired to supply with a gas under a substantially constant pressure a single outlet channel from two distinct inlet channels themselves supplied with gas under a pressure which is liable to vary below a maximum pressure. This switching valve is interposed between the two inlet channels and the single outlet channel, and it operates for ensuring automatically and without any discontinuity the supply of the outlet or downstream channel, from the two upstream channels, in a predetermined order, the stand-by upstream channel being placed in communication with the downstream channel only when the pressure in the upstream channel being drained has dropped below a pre-determined critical value. It also operates as a stop valve for cutting the communication between the downstream channel and that of the upstream channels wherein the pressure has dropped below a predetermined minimum value.

Such a switching valve is advantageously applicable, in particular, to installations wherein batteries of high pressure gas cylinders are discharging in a low pressure supply network. In such a case, the outlet from a battery of cylinders is connected with a regulator which admits the gas to the utilization network at the required low pressure, as long as the pressure within the cylinders is not below this value. To decrease as much as possible the duration of the interruptions in the supply of the utilization network, there has been used heretofore two distinct connections which are used alternately, a battery of full cylinders being substituted to an exhausted battery while a second full battery is being emptied. To this effect, the adjustment devices of the two regulators provided on each one of the connections have also been associated in such a manner that by operating a single element it be possible to reverse the adjustments, the regulator which corresponds with the battery being drained being adjusted to the pressure in the utilization network, while the other regulator is adjusted to a lower pressure, for instance the pressure which is considered as a final pressure in the emptying of the cylinders.

This solution is costly in that it requires an accurate mounting of the bodies of the regulators with respect to the control mechanism which allows the reversal of the adjustments.

The switching valve which is an object of the invention obviates this drawback. It is interposed between the two regulators and the low pressure utilization network and acts at the same time as a switching valve which controls the low pressure outlets from each regulator in such a manner that when this low pressure drops below the adjustment value for the battery being emptied, the full battery connected with the other expander can deliver at the same time as the first one for compensating this pressure drop, and as an automatic stop valve for interrupting the communication between this network and the outlet from the regulator the low pressure of which has dropped to a predetermined lower value.

The invention thus makes it possible to leave unchanged the two regulators in the board with a permanent adjustment, consequently eliminating the above mentioned drawbacks. It is characterized by the combination of two stopping elements each one of which controls a distinct gas delivery channel and which are so coupled that when the one opens the other one closes, and vice-versa, the position of the movable assembly constituted by these two elements being determined by the direction and magnitude of the resultant of the pushing force to which they are subjected, in the direction of their opening by the gas in the channels they control, and, in the direction of their closing, by means the effect of which may be regulated.

Being thus defined as to its principle, the invention is capable of various types of embodiment and particularly of those which are advantageous in that they use certain elements of the present regulators, which are applications, separately or in any combination, of the following features:

(a) Each one of the stopping elements consists of a deformable diaphragm which constitutes the movable wall of a gas chamber the inlet of which is connected with one of the high pressure batteries through a regulator and the outlet to the low pressure utilization network, said outlet being directly controlled by the diaphragm which acts like a valve.

(b) The two gas chambers are arranged on both sides of a central member on which are secured, by screwing, caps which hold the diaphragms by their peripheries and contain springs the reactions of which are exerted on the outer faces of said diaphragms, i. e. in the direction which corresponds with the closing of the outlets of the corresponding gas chambers.

(c) The two diaphragms are directly coupled by a rigid cross-stay which goes through a boring in the central member the seats for the diaphragms being provided at the ends of this boring which is in communication with a single outlet to the low pressure utilization network.

(d) The springs for pulling back the diaphragms towards the central member bear on a strap mounted with respect to the apparatus assembly for being subjected to alternate translations which make it possible to increase the tension of one spring, reducing by the same amount that of the opposite spring, and vice versa.

(e) According to one modification of the invention, one of the springs is designed for causing a pushing force twice as large as that of the opposite spring, and it bears on the corresponding diaphragm through an element which can be acted upon for suppressing its thrust on the diaphragm.

The accompanying drawings shown by way of example only, three types of embodiment of a switching valve in accordance with the invention.

Figure 1 is a diagram of an oxygen distributing board in which is applied the switching valve according to the invention.

Figure 2 is an axial section, along the line II—II—II of Figure 3 of the switching valve.

Figure 5 is a view similar to Figure 4 for another modified embodiment.

Figures 3, 4:
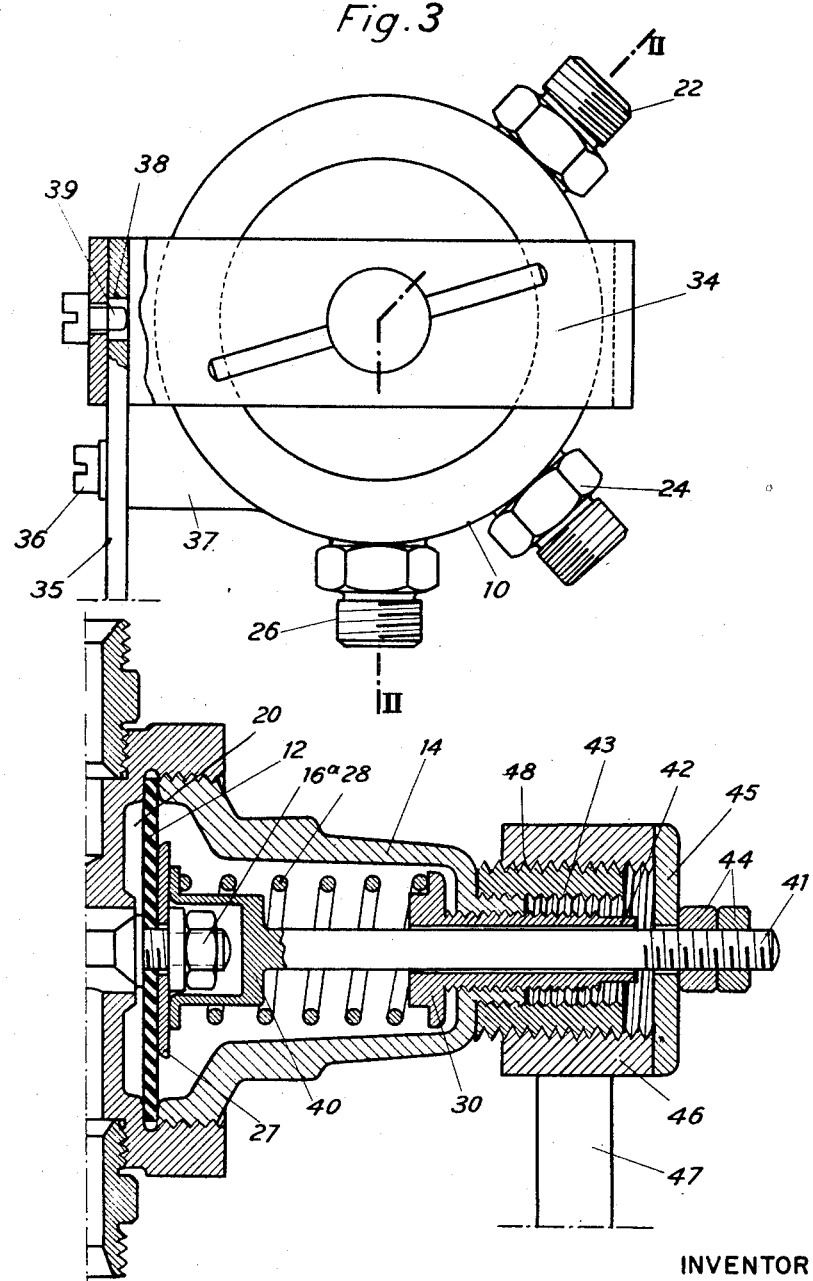
Figure 3 is an end view of the valve of Figure 2, with a partial vertical section.
Figure 4 is a half axial section of a modified embodiment.

In the application contemplated by way of example in the diagram of Figure 1, the switching valve 10, according to the invention, is mounted on the distributing board 1, interposed between batteries 2—3 of cylinders containing oxygen under a high pressure and a utilization network at low pressure 4. The apparatus on this board is distributed into two distinct branches 5 and 6 comprising a regulator 8. Each one of these branches, downstream from the corresponding valve, is connected to the inlet to the switching valve, the single outlet of which is connected with the utilization network to be supplied with low pressure oxygen. A battery of high pressure cylinders is connected with the inlet to each branch.

When the battery being emptied, for instance the battery 2, is empty, or more exactly when its inside pressure has become too low to enable its regulator 8 to ensure the necessary gas flow at a pressure at least equal to the lowest pressure acceptable for the utilization network, the switching valve comes into action, as will be explained later, first to maintain the pressure in the network at the minimum acceptable value during the complete draining of the battery 2, then to cut the communication between this empty battery and the network and, simultaneously, to establish full communication between this same network and the other battery which is full. The exhausted battery is then replaced by a fully charged battery and the utilization network 4 is supplied without any interruption through the branches 5 and 6 placed in operation alternately.

In the example of embodiment shown in Figures 2 and 3, the body of the switching valve comprises a central element 10 with a middle wall 11, on both sides of which are arranged the two deformable diaphragms 12 and 13, which constitute the adjusting elements for the flows and for stopping. These diaphragms are held by their peripheries between an annular seat in the wall 11 and a cap 14 screwed into a tapping 15 of the element 10. It should be noted that the diaphragms 12 and 13 and the caps 14 may advantageously be the same as those used for the regulators 8 in the board of Figure 1. Consequently, the outer face of the diaphragms 12 and 13 are submitted to atmospheric pressure through the apertures usually provided in the wall of the caps 14.

The two diaphragms are coupled by a rigid cross-stay 16 which passes freely through the wall 11 in a central boring 17 at the ends of which two seats 18 and 19 are provided. The two diaphragms are thus displaced as a whole with respect to the seats and, in the extreme positions, the communication between the boring 17 and one of the chambers 20 and 21 is established while the communication between this same boring and the other chamber is cut, and vice versa. Of course, between the extreme positions, both chambers 20 and 21 communicate with said boring 17. The chamber 21 corresponds, for instance, to the branch 5 of the diagram of Figure 1, said branch being connected at 22 with the element 10 and being in communication with the chamber 21 through the conduits 23 (Figure 2) while the chamber 20 corresponds to the branch 6 connected at 24 (Figure 3) with the element 10. The boring 17 is in communication through the conduit 25 with the utilization network 4 connected at 26 with the element 10. The diaphragms are held centrally between a shoulder of the cross-stay 16 and a rigid disc 27 clamped by a nut 16a, screwed on the corresponding threaded end of the cross-stay 16. The discs 27 constituting bearing soles for one of the ends of a compression spring 28 and 29, the other end of which bears on a bushing 30 bearing against the end of a screw 31 which makes it possible to vary the tension of the spring. In the example of embodiment considered, each screw 31 is screwed in a slide block 32 guided axially at 33 with respect to the cap 14, the two slide blocks 32 being coupled by a strap 34 which can effect translations in both directions along the general axis of the switching valve. To this effect, there may be provided, as shown in Figure 3 a lever 35, for control, pivoted at 36 on a boss 37 of the part 10 and engaging, by an elongated eyelet 32, the end of a finger 39, secured on one of the longitudinal branches of the strap. Any suitable means may be provided for locking the lever 35 in one or the other of the extreme positions of the strap 34.

The strap 34 being held in one of these extreme positions for instance the right hand extreme position, looking at Figures 2 and 3, in which the spring 29 is more compressed than the spring 28 and applies to the cross-stay 16 a thrust from left to right hand greater than the thrust applied to said cross-stay by the spring 28 from right to left hand. Consequently, the diaphragm 13 is applied on its seat 19 and cuts off the communication between the chamber 21 and the utilization network 4, while the diaphragm 12 is moved away from its seat 18 and the chamber 20 is in communication with the network. As long as the pressures in chambers 20 and 21 remain substantially equal the only thrust applied to the movable unit comprising the diaphragms 12 and 13 and the cross-stay 16 is a thrust equal to the difference between the thrusts applied to the same unit by the springs 29 and 28. Such a difference may be accurately regulated as any predetermined value by means of the screws 31.

The switching valve operates as follows:

It will be assumed that the pressure in the utilization network should be maintained at 8 kg./cm.$^2$, and that, consequently, the regulators 8 have been adjusted for giving, at the outlet, a pressure of 8 kg./cm.$^2$, this pressure at the outlet, obviously, being maintained only as long as the pressure in the corresponding cylinders is at least equal to 8 kg./cm.$^2$. With the setting adopted above for the springs 28 and 29, the diaphragm 12 is removed from its seat and the diaphragm 13 is applied on its own; the battery 3 discharges into the network 4 and the battery 2 remains full, as a stand by. This state of affairs lasts as long as the regulator 8 maintains a pressure of 8 kg./cm.$^2$ at the outlet.

When the battery 3 is sufficiently emptied for the pressure in the chamber 20 to drop to such a value that the equilibrium of the movable assembly comprising the diaphragms is upset, the diaphragm 13 moves away from its seat and acts like a regulator diaphragm for admitting gas in the conduit 4 at a pressure which increases as the pressure drops in the chamber 20, the total gas flow from the chambers 20 and 21 being always sufficient so that the pressure in the conduit 4 and in the utilization network does not drop below a predetermined lower limit, equal, for instance to 6 kg./cm.$^2$. When the pressure in the chamber 20 has dropped to this value of 6 kg./cm.$^2$, the diaphragm 12 is applied against its seat and the communication is cut off between the chamber and the network 4 which is now supplied only by the battery 2 through the chamber 13. It is then sufficient to bring back the strap 34 to its extreme left hand position so as to release the spring 29 and to increase the tension of the spring 28 for the resultant of the thrusts applied to the movable assembly of the switching valve to be directed from right to left and for the diaphragm 13 not to act any longer as an expander, the pressure being maintained again at 8 kg./cm.$^2$, until the battery 2 is empty in its turn. The described operations are repeated alternately, the substitution of a battery of full cylinders for the battery of empty cylinders being effected during the emptying of the full battery in communication with the utilization network and the expanders remain in their initial condition of adjustment.

The effects described may also be obtained by leaving the tension of one of the springs 28—29 constant. The strap 34 may then be omitted and replaced by means which make it possible to act on the other spring. An example of embodiment of a switching valve built on this principle is shown in Figure 4. The arrangement shown in this figure is to be substituted for the right hand half of Figure 2.

The spring 28 of Figure 4 acts on the diaphragm 12 through the medium of a part 40 which may be displaced by hand with respect to the cap 14. This part is, for example, in the shape of a bell for covering the nut 16a and resting by its base on the rigid disc 27. The bell is extended by a rod 41 guided in a part 42 which carries the cup 30 on which rests the end of the spring 28 opposite the diaphragm 12. This part 42 is screwed in a tapping 43 of the cap 14 to allow the adjustment of the initial tension of the spring 28. At its outer end, the rod 41 is threaded for receiving nuts 44 which through a washer 45 bear against the head 46 of a control lever 47 screwed by a high pitched thread 48 on the cap 14.

The switching valve thus modified operates as follows:

When the battery 2 is discharging into the network 4 through the chamber 21, the bell 40 is held away from the disc 27, by giving the lever 47 a suitable angular position. The moving assembly consisting of the diaphragms 12—13 is thus only subjected to the return thrust exerted from left to right by the spring 29 and to the thrust of opposite direction applied to the diaphragm 13 by the pressure of the gas in the chamber 21.

The tension of the spring 29 is so adjusted that as soon as this pressure drops below 8 kg./cm.², keeping the figures assumed in the above, this spring acts for moving the diaphragm 13 closer to its seat and moving the diaphragm 12 away from its seat by the same amount. The diaphragm 12 then acts as a regulator for regulating the delivery from the battery 3 into the conduit 4 with the same effects as indicated in connection with the operation of the embodiment of Figure 2.

The mechanical characteristics of the spring 28 are so selected and its initial adjustment by means of the part 42 is so effected that the thrust it exerts on the diaphragm 12 when the rod 41 has been released by a suitable operation of the lever 47, is twice more intense than the reaction of the spring 29. This amounts to saying that the movable assembly of the switching cock is only subjected by the springs to a right to left thrust equal to the reaction of the spring 29 considered alone. To this thrust is opposed that exerted by the gas of the chamber 20 on the diaphragm 12 and, when the gas pressure has dropped to 6 kg./cm.², the diaphragm 12 is applied against its seat and the diaphragm 13 removed from its seat. It is sufficient to bring back the lever 47 to a position suitable for withdrawing the diaphragm 12 from the action of the spring 28 for being again in the operating conditions of the above described phase.

Figure 5 shows an embodiment of the switching valve in which a single spring is used. This spring 28a is compressed between the disc 27 of the diaphragm 12 on which it rests through the medium of a washer 49 and a plate 50 guided so as to be able to slide freely along rods 51 secured at one end of the washer 49 and cross-stayed at their opposite ends by a washer 52. The sheath 50 rests on the front face of a part 56a screwed in a tapping 48a of the cap 14. A control lever 47a is keyed on the part 46a said lever being the equivalent of the lever 47 of Figure 4. The bearing of the plate 50 on the part 46a takes place through the medium of a needle 53 screwed in a central tapping of the plate 50 and provided at the end of a rod 54 going freely through an axial hole in the part 16 coupling the diaphragms 12 and 13. This rod, controlled by the nuts makes it possible to finish the adjustment of the initial tension of the spring 28a; to this effect, it is provided with nuts 55 and is suitably extended beyond the left end of the part 16.

This type of embodiment of the switching valve operates as follows:

It will be assumed that the lever 47a has been placed in such a position that the diaphragm 12 has been applied by its joint 12a on its seat 18 which corresponds to a bearing of the part 46a on the spring 28a through the medium of the parts 53 and 50. The battery 2 discharges alone in the conduit 4 through the chamber 21 and this continues as long as the pressure in said chamber remains at least equal to 8 kg./cm.² keeping the figures already assumed. When the pressure in the chamber 21 falls below 8 kg./cm.², the adjustment of the tension of the spring 28a is such that the thrust on the diaphragm 12 due to the pressure of 8 kg./cm.² in the chamber 20 lifts this diaphragm, producing the above described effects. The discharge of the battery 3 in the conduit 4, through the chamber 20 increases as the discharge from the battery 2 decreases and when the pressure in the chamber 21 has dropped to 6 kg./cm.², the diaphragm 12 is lifted from its seat in a maximum manner and the diaphragm 13 is applied against its own.

The lever 47a is then displaced so as to no longer press on the part 53 but to pull on the part 52 and, consequently, to lift the part 49 from the rest plate of the diaphragm 12. The spring then presses, through the medium of the parts 50, 53 of the washer 55a, and of the nuts 55 on the diaphragm 13 which is applied against its seat. A pressure drop in the chamber 20 is then necessary for compensating the push exerted by the spring and lifting the diaphragm 13.

What I claim is:

1. In a switching valve to be interposed between a gas outlet and two separate gas inlets each of which is connected to a separate high pressure gas source for supplying said outlet with gas at a low pressure substantially constantly, in combination, an elongated valve body provided with a transversely disposed middle wall, two flexible diaphragms secured at their marginal edge portions to said valve body and each spaced from and at each side of said middle wall to define a gas tight chamber on each side of said middle wall and communicating respectively with each of said high pressure gas sources, the face of each diaphragm opposite to the middle wall face being exposed always to atmospheric pressure, means extending through said middle wall for rigidly coupling said diaphragms so that they are adapted to move as a whole, said means passing freely through said middle wall through a transverse opening therein, the marginal edge portions at the ends of said opening constituting valve seats, each seat in its turn when engaged by its adjacent diaphragm constituting a valve adapted to control the communication of each gas tight chamber with the other and with said gas outlet when said valve is moved towards its closing position by moving the corresponding diaphragm towards said valve seat, resilient means adapted to apply a thrust on the atmospheric pressure side of and individual to each of said diaphragms, and means adapted to control said resilient means for applying on the whole of said diaphragms a thrust alternately directed in one direction and the other.

2. In a switching valve to be interposed between a gas outlet and two separate gas inlets each of which is connected to a separate high pressure gas source for supplying said outlet with gas at a low pressure substantially constantly, in combination, an elongated valve body provided with a transversely disposed middle wall, two flexible diaphragms secured at their marginal edge portions to said valve body and each spaced from and at each side of said middle wall to define a gas tight chamber on each side of said middle wall and communicating respectively with each of said high pressure gas sources, the face of each diaphragm opposite to the middle wall face being exposed always to atmospheric pressure, means extending through said middle wall for rigidly coupling said diaphragms so that they are adapted to move as a whole, said means passing freely through said middle wall through a transverse opening therein, the marginal edge portions at the ends of said opening constituting valve seats, each seat in its turn when engaged by its adjacent diaphragm constituting a valve adapted to control the communication of each gas tight chamber with the other and with said gas outlet when said valve is moved towards its closing position by moving the corresponding diaphragm towards said valve seat, resilient means for applying on the atmospheric pressure side of and individual to each of said diaphragms a thrust directed towards said middle wall, and means for varying said thrusts so as to alternately render a thrust on one diaphragm greater than the thrust on the other diaphragm.

3. A switching valve according to claim 1 in which the means for rigidly coupling the diaphragms is a cross-stay freely passing through a central boring in said middle wall and providing a passageway to said gas outlet, valve seats provided at the marginal edge portions at the ends of said boring whereby each adjacent diaphragm may serve as a valve when contacting its individual valve seat, a spring adapted to apply a thrust on the atmospheric pressure side of and individual to each of said diaphragms, means for separately controlling the value of each thrust, one thrust being greater than the other so that one valve is closed when the other is open, and manual means for alternately reversing the direction of the greatest thrust.

4. In a switching valve to be interposed between a gas outlet and two separate gas inlets each of which is connected to a separate high pressure gas source for supplying said outlet with gas at a low pressure substantially constantly, in combination, an elongated valve body provided with a transversely disposed middle wall, two flexible diaphragms secured at their marginal edge portions to said valve body and each spaced from and at each side of said middle wall to define a gas tight chamber on each side of said middle wall and communicating respectively with each of said high pressure gas sources, the face of each diaphragm opposite to the middle wall face being exposed always to atmospheric pressure, means extending through said middle wall for rigidly coupling said diaphragms so that they are adapted to move as a whole, said means passing freely through said middle wall through a transverse opening therein, the marginal edge portions at the ends of said opening constituting valve seats, each seat in its turn when engaged by its adjacent diaphragm constituting a valve adapted to control the communication of each gas tight chamber with the other and with said gas outlet when said valve is moved towards its closing position by moving the corresponding diaphragm towards said valve seat, a first spring adapted to apply a constant thrust on the atmospheric pressure side of and individual to one of said diaphragms, a member adapted to slide in the elongate body of the switching valve, a second spring tensioned between said member and a fixed portion of said body so as to apply on the atmospheric pressure side of the other diaphragm, through said sliding member, a thrust equal to two times the thrust applied by said first spring to its diaphragm, and means adapted to move and lock said member out of contact of said other diaphragm.

References Cited in the file of this patent

UNITED STATES PATENTS

| | | |
|---|---|---|
| 2,138,989 | Thomas et al. | Dec. 6, 1938 |
| 2,234,325 | St. Clair | Mar. 11, 1941 |
| 2,257,249 | Thomas | Sept. 30, 1941 |
| 2,354,286 | Whaley | July 25, 1944 |
| 2,380,956 | Evarts | Aug. 7, 1945 |
| 2,389,667 | Hudson | Nov. 27, 1945 |
| 2,626,628 | Norway et al. | Jan. 27, 1953 |